United States Patent [19]

Kovacs et al.

[11] Patent Number: 5,248,538
[45] Date of Patent: Sep. 28, 1993

[54] SULFONAMIDO OR AMIDO SUBSTITUTED PHTHALOCYANINES FOR OPTICAL RECORDING

[75] Inventors: Csaba A. Kovacs; William T. Gruenbaum, both of Rochester, N.Y.; James J. Krutak, Kingsport, Tenn.

[73] Assignee: Eastman Kodak Company, Rochester, N.Y.

[21] Appl. No.: 716,863

[22] Filed: Jun. 18, 1991

[51] Int. Cl.$^5$ ............................................. B32B 3/00
[52] U.S. Cl. ...................................... 428/64; 428/65; 428/457; 428/913; 346/76 L; 346/135.1; 430/945

[58] Field of Search ................... 428/64, 65, 457, 913; 346/76 L, 135.1; 430/945

[56] References Cited

U.S. PATENT DOCUMENTS 4,873,131  10/1989  Kashima et al. ...................... 428/64

*Primary Examiner*—Patrick J. Ryan
*Assistant Examiner*—Elizabeth Evans
*Attorney, Agent, or Firm*—J. Jeffrey Hawley

[57] ABSTRACT

The present invention is directed to the use of sulfonamido or amido substituted phthalocyanine dyes in optical recording. The dyes are particularly useful in making recordable compact disks. The dyes have acceptable performance yet are easy to make.

2 Claims, No Drawings

SULFONAMIDO OR AMIDO SUBSTITUTED PHTHALOCYANINES FOR OPTICAL RECORDING

FIELD OF THE INVENTION

The present invention relates to optical recording materials. The materials are particularly useful in making recordable compact disks.

BACKGROUND OF THE INVENTION

There are many types of optical recording materials that are known. In many of the materials, the mode of operation requires that the unrecorded material have a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording media which, when recorded in real time, produces a record that mimics the conventional CD on read out. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a conventional CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Materials of this type are described in U.S. Pat. No. 4,940,618, European Patent Application 0,353,393 and Canadian Patent Application 2,005,520.

Commercially useful materials of the type described in these references have stringent requirements. One of these requirements is light stability. Since the Photo CD is a consumer product, it must be capable of withstanding extreme environments. Between the time the original images are recorded on the Photo CD and the time subsequent images are recorded, the CD might be may be placed in strong sunlight, for example. The recording layer must be very light stable for this purpose.

In the U.S. and the European applications mentioned above, the preferred dyes for the recording layer are indodicarbocyanine dyes. However, this type of dye has less than the desired light stability and will in fact fade to an unusable state in only a few days of intense sunlight. These applications also disclose one phthalocyanine dye, that is a phthalocyanine dye that has a tert-butyl substituent in one of the $\beta$ positions on the aromatic rings of the dye. Similarly, the Canadian application mentioned above describes a large number of phthalocyanine dyes. However, all of these phthalocyanine dyes, while having excellent stability, are difficult and expensive to make.

For example, the phthalocyanine dyes of the Canadian application are made by first preparing components of the completed ring, which components have the necessary substituents, and then forming the phthalocyanine ring structure by thermally reacting the mixture with a metallic derivative and effecting ring closure. This is an expensive process characterized by low yield and difficult processes for separation of the desired dye from unreacted components. In a mass produced consumer product, cost of the recording layer dye is a major concern.

Thus, there is a continuing need for optical recording materials that are light stable yet less expensive than previously used phthalocyanine dyes. It is to a solution to this problem that the present invention is directed.

SUMMARY OF THE INVENTION

In accordance with the present invention, there is provided an recordable optical recording element having a transparent substrate and on the surface of said substrate, a phthalocyanine dye containing recording layer and a light reflecting layer, the improvement wherein said phthalocyanine dye is substituted in the $\beta$ positions on the aromatic rings thereof with sulfonamido or amido groups.

DETAILED DESCRIPTION OF THE INVENTION

The present invention provides optical recording elements that can be recorded and then read back using conventional CD type readers. The optical recording elements of the invention use phthalocyanine dyes that are easily made and therefore inexpensive.

The phthalocyanine dyes that are useful in the invention can be represented by the formula:

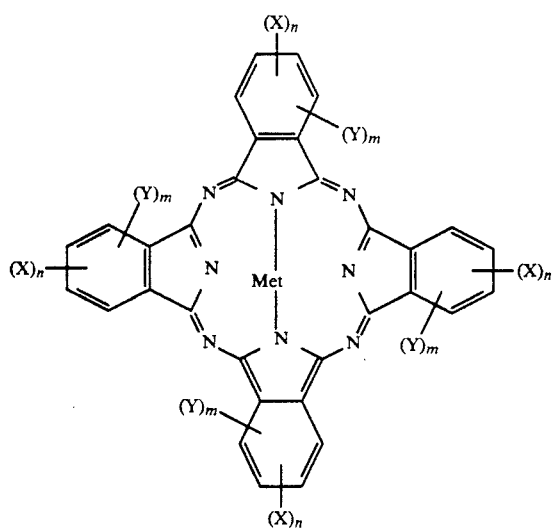

wherein the X groups are in the β position and each n is independently selected from 0, 1 and 2 such that at least one of the X groups is selected from:

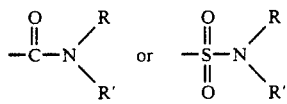

wherein R and R' are independently selected from the group consisting of hydrogen; an alkyl group having from 1 to about 25 carbon atom such as ethyl, hexyl and decyl; a cyclic alkyl group such as cyclopentyl, cyclohexyl and cycloheptyl; an aromatic or substituted aromatic group wherein the substituents can be selected from groups such as alkyl having from 1 to about 20 carbon atoms such as methyl and decyl; a heterocyclic group such as 2-pyridyl, 2-quiolyl and thionyl; and alcohol group having from 2 to about 20 carbon atoms such as 2-hydroxyethyl, 2-hydroxy-1,1-dimethylethyl, 3-hydroxy-2,2-dimethylpropyl; an ether group having from 2 to about 20 carbon atoms such as 2-methoxyethyl, 5-methoxypentyl and 3-methoxyheptyl; an acid group having from 2 to about 20 carbon atoms such as 2-carboxyethyl, 9-carboxyoctyl and 7-carboxyhexyl; and an alkyl thio group having from 2 to about 20 carbon atoms such as 2-mercaptopropyl, methylthiopentyl and 10-mercaptodecyl. The other X groups can be hydrogen or any of the groups defined below for Y or an unreacted carboxyl or sulfonyl group.

Particularly preferred X groups are long chain alkyl groups since they improve the solubility of the dye in hydrocarbon solvents. Alcohol groups are preferred where the solvent is desired to be an alcohol. Sulfur containing groups are preferred because of improved adhesion to the preferred metal for the reflective layer, gold.

Each Y is in an α position and can be individually selected from the group consisting of hydrogen; halogen such as bromine, fluorine, chlorine; alkyl having from 1 to about 20 carbon atoms such as ethyl, isopropyl, and decyl; arylalkyl wherein the alkyl portion has from 1 about 20 carbon atoms such as tolyl, decylphenyl and isobutylphenyl; alkoxy wherein the alkyl portion has from 2 to about 20 carbon atoms such as ethoxy, propoxy and cyclohexoxy; an aryloxy group such as phenoxy, p-ethylphenoxy and p-decylphenoxy; and an arylthio group such as ethylthio, mercaptopropyl and phenylthio. The value for each m can be 0, 1 or 2.

Preferred groups for Y include branched alkoxy groups such as isopropyloxy, 5-ethyloctyloxy, 1-ethyl-1-cyclohexyloxy and 1,1-dimethylpropyloxy.

Met in the formula above can be 2 H, Cu, Pd, Pt, Mn, Mg, Zn, Fe, Co, Ru Ti, Be, Ca, Ba, Cd, Hg, Pb or Sn. Met can also be Al-X, GaX, TiX, InX, XSiX, XGeX, XSnX, wherein X is Cl, Br, F, I, OH, an O-Alkyl group, $OC_6H_5$, $OC_6F_5$, or an O-substituted aryl group.

The phthalocyanine dyes used in the optical recording elements of the invention can be made by a method which starts with a completed phthalocyanine structure that is readily available in quantity. One such starting compound is copper phthalocyaninetetracarboxamide. A typical preparation for this compound is given below. It can be made in high yield, e.g. the preparation below yielded the desired compound in 91% yield.

Derivatives of phthalocyaninetetracarboxamide which are useful in the present invention are given in the Table I below. These derivatives can be prepared in high yield and purity by hydrolysing the phthalocyaninetetracarboxamide to produce the corresponding acid; reacting the acid with sulfonyl chloride to produce the acid chloride and then reacting the acid chloride with an amine of the formula HNRR'.

Throughout the present specification, a shorthand notation will be used to depict the phthalocyanine dyes. First, the Met will be given, followed by Pc which indicates the basic phthalocyanine nucleus followed by the substituents in the β position of the phthalocyanine dye. Thus, for example, $CuPc(CONH_2)_4$ is the notation for copper phthalocyaninetetracarboxamide.

TABLE I

Useful Amido Substituted phthalocyanine Dyes
$CuPc(CONRR')_n$

| Dye # | n | R | R' |
|---|---|---|---|
| 1 | 4 | —H | phenyl |
| 2 | 4 | —H | 4-methylphenyl |
| 3 | 4 | —H | 4-methoxyphenyl |
| 4 | 4 | —CH₃ | phenyl |
| 5 | 4 | —CH₂CH₃ | phenyl |
| 6 | 4 | —CH₂CH₂CH₃ | phenyl |

TABLE I-continued
Useful Amido Substituted phthalocyanine Dyes
CuPc(CONRR')$_n$

| Dye # | n | R | R' |
|---|---|---|---|
| 7 | 4 | —CH$_2$CH$_3$ | CH$_2$CH$_3$ |
| 8 | 4 | —H | —N(morpholino) |
| 9 | 4 | —H | —(CH$_2$)$_3$CH$_3$ |
| 10 | 4 | —(CH$_2$)$_3$CH$_3$ | —(CH$_2$)$_3$CH$_3$ |
| 11 | 4 | —H | —(CH$_2$)$_5$CH$_3$ |
| 12 | 4 | —(CH$_2$)$_5$CH$_3$ | —(CH$_2$)$_5$CH$_3$ |
| 13 | 4 | —H | —(CH$_2$)$_5$CH$_3$ |
| 14 | 4 | —(CH$_2$)$_7$CH$_3$ | —(CH$_2$)$_7$CH$_3$ |
| 15 | 4 | —H | —(CH$_2$)$_9$CH$_3$ |
| 16 | 4 | —H | —CH$_2$(CH$_2$CH$_3$)CH(CH$_2$)$_3$CH$_3$ |
| 17 | 1 | —H | —H |
| 18 | 2 | —H | —H |
| 19 | 3 | —H | —H |
| 20 | 2 | —H | —C$_6$H$_5$ |
| 21 | 2 | —H | —C$_6$H$_4$-CH$_3$ |
| 22 | 2 | —H | —C$_6$H$_4$-OCH$_3$ |
| 23 | 2 | —H | —C$_6$H$_4$-CN |
| 24 | 2 | —CH$_3$ | —C$_6$H$_5$ |
| 25 | 2 | —CH$_2$CH$_3$ | —C$_6$H$_5$ |
| 26 | 2 | —C$_6$H$_5$ | —C$_6$H$_5$ |

The preparation of the sulfonamides is similarly direct. Typically, the phthalocyanine sulfonyl chloride is commercially available and the sulfonamides are prepared by simply reacting the sulfonylchloride with an amine of the formula HNRR'. Table II illustrates useful sulfonamide substituted phthalocyanine dyes.

TABLE II
Useful Sulfonamido Substituted Phthalocyanine Dyes
CuPc(SO$_2$R)$_n$

| Dye # | n | R |
|---|---|---|
| 27 | 2 | —NEt$_2$ |
| 28 | 2 | —NHPh |
| 29 | 4 | —NH-(1-adamantyl) |
| 30 | 4 | —NH-t-Bu |
| 31 | 4 | —NHCH$_2$Ph |
| 32 | 4 | —NMe$_2$ |
| 33 | 4 | —N(morpholino) |
| 34 | 4 | —NHPh |
| 35 | 4 | —NH-p-C$_6$H$_4$Cl |
| 36 | 4 | —NH-m-C$_6$H$_4$Me |
| 37 | 4 | —NH-p-C$_6$H$_4$Me |
| 38 | 4 | —NH-m-C$_6$H$_4$OMe |
| 39 | 4 | —NH-p-C$_6$H$_4$OMe |
| 40 | 4 | —NH-p-C$_6$H$_4$NPh$_2$ |
| 41 | 4 | —NH-(2-pyridyl) |
| 42 | 4 | —NH-(2-benzothiazolyl) |
| 43 | 4 | —NMePh |
| 44 | 4 | —NEtPh |
| 45 | 4 | —N-(1,2,3,4-tetrahydroquinolinyl) |

Additional sulfonamido substituted phthalocyanine dyes that are useful in the present invention are listed in Table III below.

TABLE III
Sulfonamido Substituted Phthalocyanine Dyes $$CuPc(SO_2NR{-}X)_{2-4}$$
with R$_1$ on N

| Dye | R | R$_1$ | X |
|---|---|---|---|
| 46 | —C$_6$H$_4$-CH$_2$OCH$_2$-C$_6$H$_4$— | H | CO$_2$CHCH$_2$Cl |

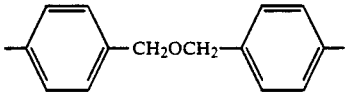

TABLE III-continued
Sulfonamido Substituted Phthalocyanine Dyes
$$CuPc(SO_2NR-X)_{2-4}$$
with $R_1$ on N
| Dye | R | $R_1$ | X |
|---|---|---|---|
| 47 | 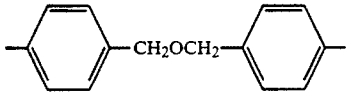 | H | $CO_2CH_2CH_2OCH_3$ |
| 48 | 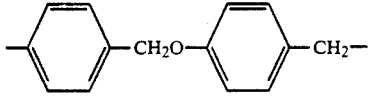 | H | $OCONHC_6H_5$ |
| 49 | 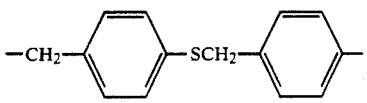 | H | $CO_2CH_2CH_2OCOCH_3$ |
| 50 | 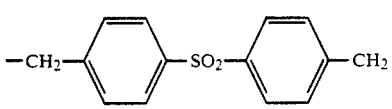 | H | $CO_2CH_2C_6H_5$ |
| 51 | 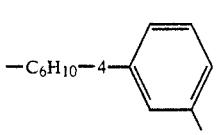 | H | $CO_2CH_2CH_2CN$ |
| 52 | 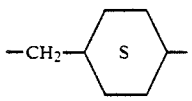 | H | OCOH |
| 53 | 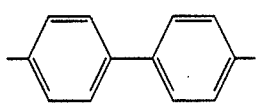 | H | $OCON(CH_3)_2$ |
| 54 | 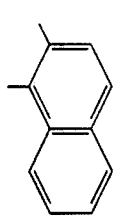 | H | $CO_2CH_3$ |
| 55 | 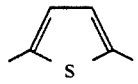 | H | $CO_2CH_3$ |
| 56 | 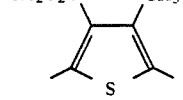 | H | $CO_2CH_3$ |
| 57 | 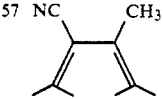 | H | $CO_2CH_3$ |

TABLE III-continued
Sulfonamido Substituted Phthalocyanine Dyes
$$CuPc(SO_2NR\overset{R_1}{-}X)_{2-4}$$
| Dye | R | $R_1$ | X |
|---|---|---|---|
| 58 | 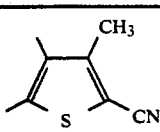 | H | $CO_2C_4H_9\text{-}n$ |
| 59 | 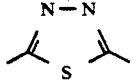 | H | $CO_2C_2H_5$ |
| 60 | 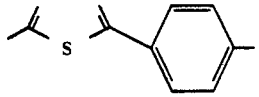 | H | $CO_2CH_3$ |
| 61 | 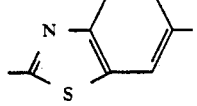 | H | $CO_2C_2H_5$ |
| 62 | 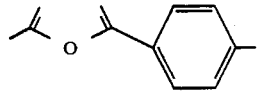 | H | $CO_2CH_3$ |
| 63 | 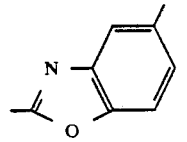 | H | $CO_2H$ |
| 64 | 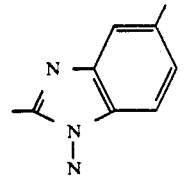 | H | $CO_2H$ |
| 65 | 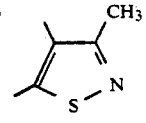 | H | $CO_2C_2H_5$ |
| 66 | 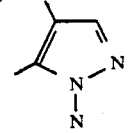 | H | $CO_2CH_3$ |
| 67 | 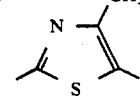 | H | $CO_2C_2H_5$ |

TABLE III-continued

Sulfonamido Substituted Phthalocyanine Dyes $$CuPc(SO_2NR\underset{\underset{R_1}{|}}{-}X)_{2-4}$$

| Dye | R | $R_1$ | X |
|---|---|---|---|
| 68 | -C6H4- (para) | PhCO2CH3 | CO2CH3 |
| 69 | 3-methylphenyl-SO2NH-(3-methylphenyl)- | H | CO2CH3 |
| 70 | -CH2CH2N(SO2CH3)-(4-phenyl)- | H | OH |
| 71 | —CH2CH2— | H | OH |
| 72 | —CH2CH(CH3)CH2— | H | OH |
| 73 | —CH2CH2OCH2CH2— | H | OH |
| 74 | —CH2CH2OCH2CH2— | H | OH |
| 75 | —CH2CH2— | CH3 | OH |
| 76 | —(CH2)6— | H | OH |
| 77 | —CH2CH2— | CH2CH2OH | OH |
| 78 | —CH2CH2— | CH2CH2OCH2OCH3 | OCOCH3 |
| 79 | —CH2CH2— | H | OCOCH3 |
| 80 | —CH2CH2— | H | OCO2C2H5 |
| 81 | —CH2C(CH3)2CH2 | H | OH |
| 82 | —CH2CH2CH2— | C2H5 | OCOC2H5 |
| 83 | —CH2CH2CH2CH2— | H | COOH |
| 84 | —CH2CH2CH2CH2— | H | CO2CH2CH2OH |
| 85 | —CH2CH2CH2CH2— | H | CO2CH3 |
| 86 | —CH2CH2— | C6H11 | OH |
| 87 | —CH2CH2— | C6H5 | OCOCH3 |
| 88 | —CH2CH2— | C6H5 | CO2C2H5 |
| 89 | —CH2CH2SCH2CH2— | H | OH |
| 90 | —CH2CH2SO2—CH2CH2CH2CH2CH2— | H | OH |
| 91 | —(CH2CH2O)2CH2CH2— | H | OH |
| 92 | —CH2CH2N(SO2CH3)CH2CH2— | H | OCO2CH3 |
| 93 | —CH2CH2SO2NH(CH2)4— | H | CO2CH3 |
| 94 | —CH2CH2SO2N(CH3)CH2CH2— | H | OH |
| 95 | —CH2Ph— | H | CO2H |
| 96 | —CH2Ph— | H | CO2CH3 |
| 97 | —CH2CH2Ph— | H | CO2C2H5 |
| 98 | —CH2CH2OPh— | H | COOH |
| 99 | —CH2CH2O-(phenyl with CO2CH3 and CH3 substituents)- | H | CO2CH3 |
| 100 | —CH2CH(OH)CH2— | H | OH |
| 101 | —CH2CH(OCOCH3)CH2— | H | OCOCH3 |
| 102 | —CH2-(tetrahydrothiopyran)-CH2— | H | OH |
| 103 | —CH2-(tetrahydrothiopyran)-CH2— | H | CO2H |

TABLE III-continued

Sulfonamido Substituted Phthalocyanine Dyes

$$CuPc(SO_2NR-X)_{2-4}$$
with $R_1$ on N

| Dye | R | $R_1$ | X |
|---|---|---|---|
| 104 | —CH$_2$CH$_2$S—(phenyl) | H | CO$_2$H |
| 105 | —CH$_2$CH$_2$OPhOCH$_2$CH$_2$— | H | CO$_2$H |
| 106 | —CH$_2$PhCH$_2$— | H | CO$_2$C$_4$H$_{9}$-n |
| 107 | (1,2-phenylene) | H | CO$_2$CH$_3$ |
| 108 | (1,3-phenylene) | H | CO$_2$CH$_3$ |
| 109 | (1,4-phenylene) | H | CO$_2$CH$_3$ |
| 110 | (phenylene with CO$_2$CH$_3$ substituent) | H | CO$_2$CH$_3$ |
| 111 | (4,4'-diphenyl ether) | H | CO$_2$CH$_3$ |
| 112 | (1,4-phenylene) | C$_2$H$_5$ | CO$_2$C$_2$H$_5$ |
| 113 | —C(CH$_3$)$_2$CH$_2$— | H | OH |
| 114 | —(CH$_2$)$_9$— | H | CH$_3$ |

Mixtures of the above dyes can also be used.

The preparation of the optical recording element of the invention is achieved by spin coating of the near infrared dye by itself, or with other dye or dyes with an addenda from a suitable solvent onto a transparent substrate. For coating, the infrared dye with or without addenda is dissolved in a suitable solvent so that the dye is 20 or less parts by weight to 100 parts by weight of solvent by volume. The dye recording layer of the element is then overcoated with a metal reflective layer under reduce pressure by resistive heating or a sputter method and finally overcoated with a protective resin.

Substrates can be made from optically transparent resins with or without surface treatment. The preferred resins are polycarbonates and polyacrylates.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methoxy-2-propanol, methyl ethyl ketone, 4-hydroxy-4-methyl-2-pentanone, hexane, cyclohexane, ethylcyclohexane, octane, benzene, toluene, and xylene. Other less desirable solvents include water, dimethylsulfoxide and sulfuric acid. Preferred solvents are hydrocarbon solvents and alcohol solvents since they have the least effect on the preferred polycarbonate substrates.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV cureable acrylates.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Both of these patents are assigned to Taiyo Yuden.

Copper Phthalocyaninetetracarboxamide

A mixture of trimellitic anhydride (123 g, 0.64 mol), urea (307 g, 5.1 mol), anhydrous cupric chloride (22.3 g.) 0.16 mol, CuCl-2H$_2$O dried overnight under vacuum at 100°), ammonium molybdate (1.0 g), and 1-chloronaphthalene (500 mL) was heated to 120° C. over one hour, at which time a green color appeared and some foaming occurred. The foam subsided as the temperature increased to 170° C. over the next hour. Heating was continued for a total of 20 h to a final temperature of 200° C. Chloronaphthalene was decanted from the cooled reaction mixture and water was added. The softened product was broken up and suction filtered with water and ethanol washing. The filter cake was stirred in 1000 mL of 10% aqueous hydrochloric acid overnight, then filtered with water washing to a damp cake. The cake was stirred in 2000 mL of DMF at 100° C. for two days, suction filtered with DMF and acetone washing, and dried under vacuum at 125° C. to constant mass. The yield of dark reddish-blue solid was 109 g (91%). Calcd for $C_{36}H_2OCuN_{12}O_4$: C, 57.79; H, 2.69; Cu, 8.49; N, 22.47; 0, 8.49. Found: C, 54.0; H, 3.2; N, 22.1. Field desorption mass spectrum: m/e 748-751.

Copper Phthalocyaninetetracarboxylic Acid

A mixture of 45.0 g of copper phthalocyaninetetracarboxamide, 475 mL of 50% aqueous sodium hydroxide solution, and 220 mL of water was heated at 75° C. for 72 h, stirred for 24 h while cooling, diluted to 2500 mL with water, acidified by addition of 1500 mL of 6N hydrochloric acid, and left standing overnight. The supernatant was siphoned off, and the precipitate was suction filtered with water washing. The air-dried filter cake was further purified by stirring in 400 mL of concentrated sulfuric acid for 18 h, filtering into 2500 mL of water, and centrifuging. The precipitate was redispersed in water and recentrifuged, stirred in 2000 mL of aqueous ethanol for three days, and suction filtered. The yield of vacuum dried (115° C.), blue powder was 39.5 g (87%). Calcd for $C_{36}H_{16}CuN_8O_8$: C, 57.5; H, 2.1; N, 14.9. Found: C, 57.2; H, 2.2; N, 14.8. Field desorption mass spectrum: m/e 751-754.

Copper Phthalocyaninetetracarboxylic Acid Tetrachloride

A mixture of 20.0 g (0.027 mol) of copper phthalocyaninetetracarboxylic acid and 100 mL of thionyl chloride was refluxed under nitrogen for 22 h. The thionyl chloride was removed under reduced pressure, and the product rinsed with toluene and dried in a vacuum dessicator. Yield of dark solid was 20 g (91%). The material was used without further purification or analysis. The infrared spectrum featured a broad carbonyl stretch centered at 5.72 pm.

Copper N,N',N'',N'''-Tetraphenylphthalocyaninetetracarboxamide

A mixture of 4.5 g (0.0056 mol) of the mixture mode immediately above and 100 mL of aniline was refluxed for 26 h. The cooled reaction mixture was diluted with 200 mL of ethyl ether, suction filtered with ethyl ether and ethanol washing, reslurried in 100 mL of ethanol, filtered with ethanol washing, pulverized and dried under vacuum at about 100° C. . The yield was 5.25 g (89%). Calcd for $C_{60}H_{36}CuN_{12}O_4$: C, 68.5; H, 3.4; N, 16.0. Found: C, 65.8; H, 3.7; N, 16.14 FDMS: m/e 1051-1054.

Synthesis of N-substituted Copper Phthalocyanine-sulfonamides

Copper Phthalocyaninetetrasulfonic Acid Tetrachloride

Chlorosulfonic acid (70 mL) was cooled in an ice bath and charged with 13.7 g (0.024 mol) of copper phthalocyanine. The mixture was heated to 140° C. over 25 min and the temperature maintained for five hours. The mixture was cooled to ca. 50° C. over 45 min. Thionyl chloride (30 mL) was then added over 30 min. The reaction mixture was reheated to 80°-85° C. for 2.5 h, then left to cool overnight. The cooled solution was added slowly to a mixture of 800 mL of water and 1600 g of ice. Additional ice was added as required during the quenching of the sulfochlorination. Suction filtration with water washing afforded 25.2 g of dark blue solid. Vacuum drying left 21 g (90%) which was used without further purification. Calcd for $C_{32}H_{12}Cl_4CuN_8O_9S_4$: C, 39.62; H, 1.25; Cl, 14.62; Cu, 6.55; N, 11.55; O, 13.20; S, 13.22. Found: C, 36.9; H, 1.5; Cl, 10.9; Cu, 5.6; N, 10.5; S, 13.8. The combustion analysis was consistent with the structure $CuPc(SO_2Cl)_3\cdot(SO_3H)$.

Copper N, N', N'', N'''-Tetrapyridyltetrasulfonamidophthalocyanine

A slurry of copper phthalocyaninetetrasulfonic acid tetrachloride(4.85 g, 0.0028 mol), 2-amino-pyridine (2.35 g, 0.025 mol) and sodium bicarbonate (1.35 g) in 60 ml water was heated at 70' C. for 24 h. The cooled mixture was diluted with 100ml of water and suction filtered to afford 1.86 g of a dark blue solid. Analysis was consistant with the title compound.

Preparation of $CuPc[SO_2NHCH_2C(CH_3)_2CH_2OH]_{2.5}$.

A sample (300 g, 30 solids — 100 g dry basis) of water-wet copper Phthalocyaninesulfonyl chloride containing an average of about 2.5 sulfonyl chloride groups per molecule is added to a stirred beaker containing tetrahydrofuran (500 mL) and 3-amino-2,2-dimethylpropanol (100 mL) with good stirring to facilitate solution with external ice-water cooling at about 0°-5° C. The reaction mixture is allowed to warm gradually to room temperature and stirring continued for about 12 hours and then drowned into 2L of dilute hydrochloric acid (ph<5-6). The blue solid is collected by filtration and the wet filter cake reslurried in 2L of 5% hydrochloric acid and filtered with vacuum. Most of the water is removed by vacuum filtration and air drying and then the still somewhat moist filter cake is added to tetrahydrofuran (250 mL) and the tetrahydrofuran and water removed under vacuum to leave a fairly dry product.

This product when analyzed by thin-layer chromatography, shows a small amount of very polar by-product presumed to be some of the sulfonic acid derivative. This compound can be used without further purification.

Further purification to remove most of the sulfonic acid derivative is accomplished by dissolving a portion (25 g) of the crude material in tetrahydrofuran (100 mL) followed by chromatography in a coarse glass-fritted funnel using methylene chloride followed by methylene chloride:tetrahydrofuran (50:50 v/v)-for elution until no more blue color is eluted. The effluents are combined and the solvent removed under vacuum to leave the cyan product (18.8 g) essentially free of any sulfonic acid derivative. The compound had the formula $CuPc[SO_2NHCH_2C(CH_3)_2CH_2OH]_{2.5}$.

Preparation of $CuPc[SO_2NHC(CH_3)_2CH_2OH]_{2.5}$

A sample (300 g 30% solids —100 g dry basis) of water-wet copper phthalocyaninesulfonylchloride containing an average of about 2.5 sulfonyl chloride groups per molecule is reacted with 2-amino-2-methyl-1-propanol (100 mL) and the product was chromatographed to give a sulfonamide derivative represented by the formula $CuPc[SO_2NHC(CH_3)_2CH_2OH]_{2.5}$.

The following examples are presented for a further understanding of the invention.

EXAMPLE 1

A polycarbonate disc substrate having a thickness of 1.2 mm, an outer diameter of 120 mm and an inner diameter of 15 mm and having a spiral pregroove formed on its surface with a width of 0.4 um, and a depth of 0.14 um and a pitch of 1.6 um, was made by injection molding.

To form the light absorptive layer 1 part by weight of $CuPc[SO_2NHCH_2C(CH_3)_2CH_2OH]_{2.5}$ prepared as described above was dissolved in 50 parts of methyl cellosolve (also known as 2-methoxy ethanol) by volume by stirring the solution at room temperature for two hours. Then, the solution was filtered through a 0.2μ filter and coated on the surface of the substrate by spin coating to a optical density of 0.8 at 680 nm. The disc was dried at 82° C. for 15 minutes.

A gold reflective layer was deposited on the entire surface of this disc by sputtering to 1000 A thickness.

To test the optical disc thus obtained a test system consisting of an optical head with a 785 nm laser, a 0.5 NA lens, phase tracking, and ½ aperture focusing. The optics used circularly polarized light to reduce laser feedback effects. Read power was kept at 0.6 mW.

Recording and playback was carried out at 2.8 m/s. Single frequency was recorded with a 1.5 micron mark length. At 20 mW write power, measured through a 30 KHz filter, SNR was 54 dB.

EXAMPLE 2

A solution of $CuPc[SO_2NHCH_2C(CH_3)_2CH_2OH]_{2.5}$ was prepared as in example 1. The dye was spin coated on the surface of a substrate to an optical density of 0.66 at 680 nm. It was dried at 82° C. for 15 minutes.

A gold reflective layer was deposited on the entire surfactant of the disc by sputtering to an 1000 A thickness.

The same testing procedure was used as in Example 1. In this case the SNR was found to be 51 dB at 21 mW write power.

EXAMPLE 3

A solution of 1 part by weight $CuPc[SO_2NH-2-pyridyl]_4$ was prepared in 50 parts by volume of 2,2,3,3-tetrafluoropropanol. The dye solution was spin coated onto a substrate to an optical density of 0.5 at 680 nm. It was dried at 82° C. for 15 minutes.

A gold reflective layer was deposited on the entire surface of the dye layer by sputtering to a 1000 A thickness.

The same testing procedure was used as in Example 1. In this case, the SNR was found to be 48 dB at a write power of 14 mW.

EXAMPLE 4

A solution of 1 part by weight $CuPc[SO_2NH-2-pyridyl]_4$ and one part by weight of an adenda dye $CuPc[CH_2N(CH_2CH_2CH_2CH_3)_2]_4$ in 100 parts by volume of 2,2,3,3-tetrafluoropropanol was prepared.

A gold reflective layer was deposited on the entire surface of the dye layer by sputtering to a 1000 A thickness.

The same testing procedure was used as in Example 1. In this case, the SNR was found to be 53 dB at a write power of 18 mW.

The invention has been described in detail with particular reference to preferred embodiments thereof but it will be understood that variations and modifications can be effected within the spirit and scope of the invention.

What is claimed is:

1. A recordable optical recording element having a transparent substrate and on the surface of said substrate, a recording layer consisting essentially of a phthalocyanine dye and a light reflecting layer, the improvement wherein said phthalocyanine dye is substituted in the β positions on the aromatic rings thereof with sulfonamido or amido groups.

2. A recordable optical recording element according to claim 1 wherein said phthalocyanine dye is represented by the formula:

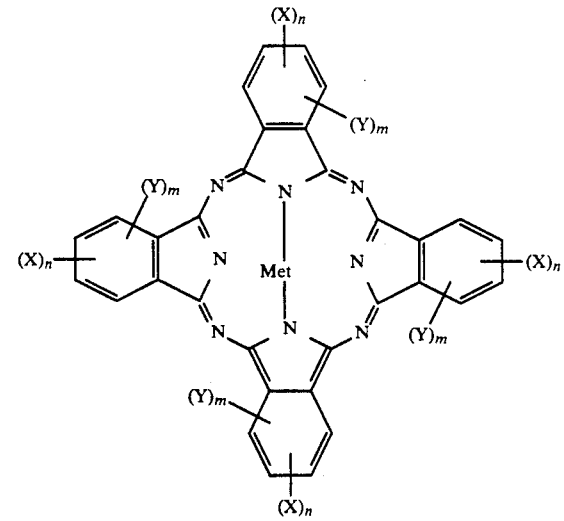

wherein the X groups are in the β position and each n is independently selected from 0, 1, 2, 3 and 4 such that at least one of the X groups is selected from:

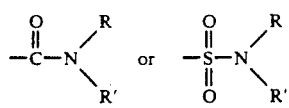

wherein R and R' are independently selected from the group consisting of hydrogen; an alkyl group having from 1 to about 25 carbon atoms; a cyclic alkyl group; an aromatic or substituted aromatic group wherein the substituents can be selected from groups; a heterocyclic group; an alcohol group having from 2 to about 20 carbon atoms and; an ether group having from 2 to about 20 carbon atoms; an acid group having from 2 to about 20 carbon atoms; and an alkyl thio group having from 2 to about 20 carbon atoms; X groups can be hydrogen or any of the groups defined below for Y or an unreacted carboxyl or sulfonyl group; and each Y is in an α position and can be individually selected from the group consisting of hydrogen; halogen; alkyl having from 1 to about 20 carbon atoms; arylalkyl wherein the alky portion has from 1 to about 20 carbon atoms; alkoxy wherein the alkyl portion has from 2 to about 20 carbon atoms; an aryloxy group; and an arylthio group and the value for each m can be 0, 1, 2, 3 and 4 and Met can be 2 H, Cu, Pd, Pt, Mn, Mg, Zn, Fe, Co, Ru, Ti, Be, Ca, Ba, Cd, Hg, Pb or Sn; or Met can be Al-X, GaX, TiX, InX, XSiX, XGeX, XSnX, wherein X is Cl, Br, F. I, OH, an O-Alkyl group, $OC_6H_6$, $OC_6F_6$, or an O-substituted aryl group.

* * * * *